United States Patent [19]
Archer

[11] 3,717,643
[45] Feb. 20, 1973

[54] N-SUBSTITUTED-NORAPOMORPHINES
[75] Inventor: Sydney Archer, Delmar, N.Y.
[73] Assignee: Sterling Drug Inc., New York, N.Y.
[22] Filed: May 4, 1967
[21] Appl. No.: 636,022

[52] U.S. Cl....260/289 R, 260/283 CN, 260/283 SY, 260/285, 260/289 A, 260/999, 424/260
[51] Int. Cl. ............................................C07d 43/28
[58] Field of Search ..........................260/285, 289 R

[56] References Cited

OTHER PUBLICATIONS

Weisbach et al., J. Med. Chem., Vol. 6, pp. 91 to 97 (1963).

Bentley, The Isoquinoline Alkaloids, Pergamon Press, New York, 1965, pp. 66, 67, 144 and 145 QD421 B3i.

*Primary Examiner*—Leland A. Sabastian
*Attorney*—Elerm J. Lawson, B. Woodrow Wyatt, Thomas L. Johnson, Robert K. Bair, R. Clifford Bourgeois, William G. Webb and Roger T. Wolfe

[57] ABSTRACT

Certain N-substituted-norapo-morphines useful as emetics, hypotensives, and CNS stimulants.

7 Claims, No Drawings

N-SUBSTITUTED-NORAPOMORPHINES

This invention relates to new N-substituted-norapomorphines having the formula

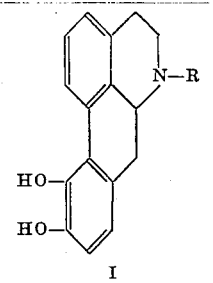

I where R is lower-alkyl of from two to four carbon atoms, 2-chlorobutyl, cyclopropyl, cyclopropylmethyl, or 2-phenylethyl. When R is lower-alkyl of from two to four carbon atoms, the lower-alkyl group can be straight or branched, and thus R as lower-alkyl represents, inter alia, ethyl, n-propyl, isopropyl, n-butyl, and the like.

The compounds of formula I above have emetic activity and are thus useful in medicine, for example, in cases of acute poisoning, alcoholic intoxication, acute indigestion, or in other cases where it is necessary or desirable to empty the stomach contents rapidly, and apomorphine (I: R is $CH_3$) is a well-known emetic agent used for this purpose. The compounds of the present invention, especially N-ethyl-and N-n-propyl-norapomorphine, however, have been found to be substantially more active as emetic agents than apomorphine, while their toxicity is of approximately the same order of magnitude as the latter. The instant compounds therefore possess a greater therapeutic ratio, i.e., the ratio of the toxic dose to the effective dose, in comparison with apomorphine.

The instant compounds also have been found to have hypotensive and CNS stimulant activities further indicating their usefulness as hypotensive agents and CNS stimulants, and again the N-ethyl-and N-n-propyl-norapomorphine have substantially greater hypotensive activity than the known apomorphine.

The compounds of formula I above are prepared by acid-catalyzed rearrangement of an N-substituted-normorphine according to the equation:

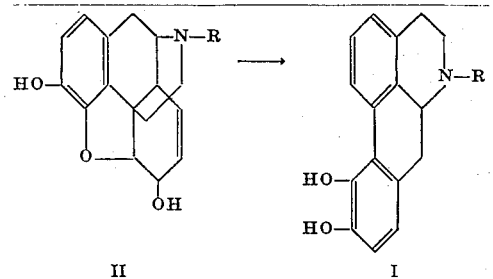

where R has the meanings given above. A preferred acid catalyst is phosphoric acid/anhydrous hydrogen chloride.

The compounds of formula I where R is 2-chlorobutyl are produced when the compounds of formula II, where R is cyclopropylmethyl, are rearranged in a phosphoric acid/anhydrous hydrogen chloride mixture. During the reaction, not only does rearrangement take place as described above, but the cyclopropyl ring is also opened by the attack of a molecule of hydrogen chloride.

The compounds of formula I where R is cyclopropylmethyl are therefore advantageously prepared by alkali metal aluminum hydride reduction of the corresponding N-cyclopropylcarbonylnorapomorphine (I: R is $C_3H_5CO$) at a temperature between about 0° C. and about 65° C. in an organic solvent inert under the conditions of the reaction, for example, ether or tetrahydrofuran. It is preferred to use lithium aluminum hydride in refluxing tetrahydrofuran.

The compounds of formula I were R is cyclopropylmethyl can also be prepared by rearrangement of N-cyclopropylmethylnormorphine, as described above, in the absence of hydrogen chloride, under which conditions the cyclopropylmethyl group survives the rearrangement without ring opening.

The N-cyclopropylcarbonylnorapomorphine is in turn prepared by reacting norapomorphine (I: R is H) with a cyclopropylcarbonyl halide in an organic solvent inert under the conditions of the reaction, for example, benzene, toluene, xylene, and the like, and in the presence of an acid-acceptor, for example, tri-lower-alkylamines or alkali metal carbonates or bicarbonates, the purpose of which is to take up the hydrogen halide split out during the course of the reaction.

The N-substituted-normorphines of formula II are in turn prepared by alkylation of normorphine with an appropriate alkyl halide, RX, where X is halogen, and R has the meanings given above. The reaction is represented by the equation:

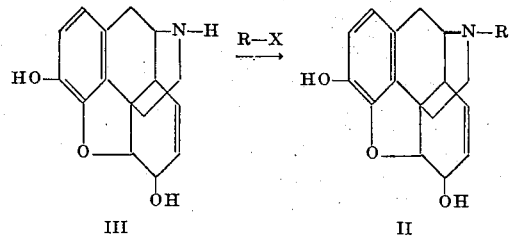

III        II

The reaction is preferably carried out in the presence of an acid-acceptor and in an organic solvent inert under the conditions of the reaction, for example, methanol, ethanol, benzene, toluene, dimethylformamide, and the like. The purpose of the acid-acceptor is to take up the hydrogen halide which is split out during the course of the reaction and can be any basic substance which forms water-soluble salts easily separable from the reaction mixture. Suitable acid-acceptors are alkali metal hydroxides, for example sodium and potassium hydroxides, and alkali metal carbonates or bicarbonates, for example sodium or potassium carbonates or bicarbonates.

Alternatively the N-substituted-normorphines of formula II, required as intermediates for the preparation of the compounds of formula I, are prepared by reductive alkylation of normorphine (formula III). That is, normorphine is reacted with an aliphatic aldehyde under acidic conditions in the presence of a reducing agent. It is preferred to carry out the reaction in an organic solvent inert under the conditions of the reaction, for example, methanol, ethanol, isopropanol, and the like, in the presence of acetic acid. A preferred reducing agent is sodium borohydride.

The normorphine of formula III above, required as an intermediate in the preparation of the N-substituted-normorphines of formula II is in turn prepared by the procedure described in U.S. Pat. No. 2,890,221, that is, by reaction of heroin (diacetylmorphine) with cyanogen bromide followed by acid hydrolysis of the resulting N-cyanonorheroin with aqueous mineral acid.

Alternatively the compounds of formula I can be prepared by Pschorr cyclization of a 1-(2-amino-3,4-di-lower-alkoxybenzyl)-2-substituted-1,2,3,4-tetrahydroisoquinoline, having the formula IV, and hydriodic acid cleavage of the resulting N-substituted-norapomorphine di-lower-alkyl ether having the formula V according to the equations:

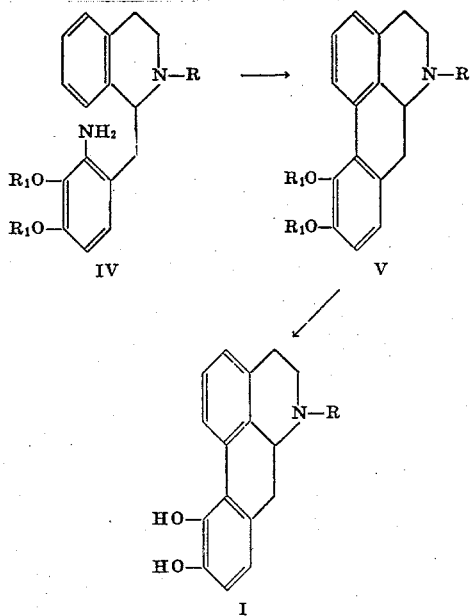

where $R_1$ represents lower-alkyl and R has the meanings given above. This latter procedure is described and claimed in Neumeyer application, Ser. No. 638,184, filed concurrently herewith.

When the compounds of formula I are prepared by the above-described procedure from a racemic 1-(2-amino-3,4-di-lower-alkoxybenzyl)-2-substituted-1,2,3,4-tetrahydroisoquinoline, the product produced is isolated as a racemic mixture. On the other hand, when the compounds of formula I are prepared by acid-catalyzed rearrangement, as described above, of an N-substituted-normorphine obtained from natural sources and thus optically active, the products of formula I produced in the reaction retain the optical activity.

The compounds of formula I are basic substances which interact with one equivalent of an organic or inorganic acid to form the corresponding acid-addition salts. These acid-addition salts and the free bases of course have the common structural entity represented by structural formula I. The acid-addition salts are the full equivalents of the free base form, and the new compounds of this invention include both the free bases and the acid-addition salts thereof. The novel feature of the compounds of the invention thus resides in the concept of the bases and the cationic forms of the new N-substituted-norapomorphines and not in any particular acid moiety or acid anion associated with the salt form of the compounds; rather, the acid moieties or anions which can be associated in the salt form are in themselves neither novel nor critical and therefore can be any acid anion or acid-like substance capable of salt formation with bases. It will be appreciated that in aqueous solutions the base form and the acid-addition salt form of the compounds of the invention possess a common protonated cation or ammonium ion.

Thus, the acid-addition salts discussed above and claimed herein are prepared from any organic acid, inorganic acid (including organic acids having an inorganic group therein), an organo-metallic acid as exemplified by organic mono- and poly-carboxylic acids such as found, for example, in Beilstein's Organische Chemie, 4th Ed., Volumes III, IV, IX, X, XIV, XVII, XIX, XXI, XXII, and XXV; organic mono- and polysulfonic and —sulfinic acids such as found, for example, in Beilstein Volumes VI, XI, XVI, and XXII; organic phosphonic and phosphinic acids such as found, for example, in Beilstein Volumes XI and XVI; organic acids of arsenic and antimony such as found, for example, in Beilstein Volume XVI; organic heterocyclic carboxylic, sulfonic, and sulfinic acids such as found, for example, in Beilstein Volumes XVIII, XXII, and XXV; acidic ion-exchange resins; and inorganic acids of any acid-forming element or combination of elements such as found in Mellor, Comprehensive Treatise on Inorganic and Theoretical Chemistry, Longman's Green and Co., New York, N.Y., Volumes I–XVI. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there are also comprehended acidic phenolic compounds such as found, for example, in Volume VI of Beilstein, acidic compounds having "activated" or acidic hydrogen atoms, as for example, picrolonic acid, or barbituric acid derivatives having an acidic proton such as found, for example, in Cox et al., Medicinal Chemistry, Vol. IV, John Wiley and Sons, Inc., New York, N.Y. (1959). Also comprehended as salt-forming agents are so-called Lewis acids which lack a pair of electrons in the outer "electron shell" and react with basic compounds having an unshared pair of electrons to form salts, for example, boron trifluoride.

Representative acids for the formation of the acid-addition salts include formic acid, acetic acid, isobutyric acid, alpha-mercaptopropionic acid, trifluoroacetic acid, malic acid, fumaric acid, succinic acid, succinamic acid, glutamic acid, tartaric acid, oxalic acid, pyromucic acid, citric acid, lactic acid, glycolic acid, gluconic acid, saccharic acid, ascorbic acid, penicillin, benzoic acid, phthalic acid, salicylic acid, acetylsalicylic acid, 3,5-dinitrobenzoic acid, anthranilic acid, pamoic acid, chloic acid, 2-pyridinecarboxylic acid, 3-hydroxy-2-naphthoic acid, picric acid, quinic acid, tropic acid, 3-indoleacetic acid, barbituric acid, sulfamic acid, methanesulfonic acid, ethanesulfonic acid, isethionic acid, benzenesulfonic acid, p-toluenesulfonic acid, saccharin, butylarsonic acid, methanephosphonic acid, acidic ion-exchange resins, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, arsenic acid, and the like.

The acid-addition salts are prepared in conventional fashion, for instance either by direct mixing of the acid and the base or, when this is not appropriate, by dissolving the acid and the base separately in a suitable solvent and mixing the two solutions, or by dissolving both the acid and the base together in a solvent. The resulting acid-addition salt is isolated by filtration, if it is insoluble in the reaction medium, or by evaporation of the reaction medium to leave the acid-addition salt as a residue.

The new bases of formula I and the acid-addition salts thereof have pharmacodynamic properties and are particularly useful as emetics, hypotensives, and C.N.S. stimulants, as described above.

The acid-addition salts of the bases of formula I are useful not only as emetics, hypotensives, and C.N.S. stimulants as above indicated, but are also useful as characterizing or identifying derivatives of the free bases and in isolation or purification procedures. Moreover, the acid-addition salts react with strong bases, such as alkali metal hydroxides, to regenerate the free bases, and accordingly all of the salts, regardless of considerations of solubility, toxicity, physical form, or the like of a particular species of acid-addition salt, are useful for the purposes of the invention since they are sources of the free bases.

It will be appreciated from the above that if one or more of the characteristics, such as solubility, molecular weight, physical appearance, toxicity, or the like, of a given acid-addition salt render it less suitable or unsuitable for the particular desired purpose, as for example, use as an emetic or hypotensive agent or in an isolation or purification procedure, or the like, the acid-addition salt can be converted to the free base and then to another, more suitable acid-addition salt, for instance a pharmaceutically-acceptable salt when a pharmaceutical use is involved.

The following examples will further illustrate the invention without the latter being limited thereto:

EXAMPLE 1

1-N-Cyanonorheroin

To a stirred solution of 22 g. (0.21 mole) of cyanogen bromide in 400 ml. of chloroform was added a solution of 65.4 g. (0.177 mole) of heroin in 300 ml. of chloroform at room temperature. The solution was then stirred at room temperature for 1½ hours, refluxed for 3 hours, allowed to stand overnight, and decanted from a small amount of insoluble material. The supernatant liquid was evaporated to dryness in vacuo, and the residual solid was triturated with methanol and collected giving 44.1 g. of 1-N-cyanonorheroin, m.p. 242°–246° C. (uncorr.).

EXAMPLE 2

1-Normorphine (III)

A solution of 15.9 g. (0.042 mole) of 1-N-cyanonorheroin in 72 ml. of concentrated hydrochloric acid was heated on a steam bath for five minutes, diluted with 570 ml. of water, and warmed on a steam bath for an additional seven hours with stirring. The clear solution was then filtered, concentrated to a volume of about 200 ml., cooled, and basified with concentrated ammonium hydroxide. The solid which separated was collected, washed with ice water, and dried giving 10.8 g. of normorphine.

EXAMPLE 3

1-N-Ethylnormorphine (II: R is $C_2H_5$).

A mixture of 2.5 ml. of acetaldehyde, 2.5 g. (0.009 mole) of 1-normorphine, 7.5 ml. of glacial acetic acid, 40 ml. of ethanol, 14 ml. of water, and 1.2 g. of anhydrous sodium acetate was treated portion-wise at $-2°$ C. with 0.9 g. (0.024 mole) of sodium borohydride. Second portions of 2.5 ml. of acetaldehyde and 0.9 g. of sodium borohydride were added and the reaction mixture allowed to warm to room temperature. Excess borohydride was decomposed by addition of 25 ml. of concentrated hydrochloric acid, the mixture was extracted with three 50 ml. portions of ether, and the aqueous phase was basified to pH 9 with concentrated ammonium hydroxide. Extraction of the aqueous phase with methylene dichloride, drying the extracts over sodium sulfate, and evaporation of the extracts to dryness afforded 2.2 g. of 1-N-ethylnormorphine, m.p. 200°–202° C.

Anal. Calcd. for $C_{18}H_{21}NO_3$: C, 72.21; H, 7.07; N, 4.68

Found: C, 72.03; H, 7.11: N, 4.61.

EXAMPLE 4 H, N,

1-N-Ethylnorapomorphine Hydrochloride (I: R is $C_2H_5$)

A solution of 5.1 g. (0.017 mole) of 1-N-ethylnormorphine in 70 ml. of 85 percent phosphoric acid was heated at 150°–153° C. for 1 hour while anhydrous hydrogen chloride was passed through the solution. The cooled reaction mixture was poured into 85 ml. of saturated aqueous sodium chloride, and the gummy precipitate which separated was triturated with cold water, dissolved in 75 ml. of warm water, and the resulting solution treated with a solution of 12 g. of sodium sulfite in 60 ml. of water. The cream-colored solid that separated was extracted with methylene dichloride and chloroform. The extracts were set aside, and the residue was extracted with boiling ethanol. The ethanol extract was then acidified with a solution of hydrogen chloride in ether and diluted with ether to precipitate the hydrochloride salt, which was collected and dried giving 280 mg. of colorless needles consisting of 1-N-ethylnorapomorphine hydrochloride, m.p. 280°–282° C.

Anal. Calcd. for $C_{17}H_{20}NO_2HCl$: C, 68.03; H, 6.34; Cl, 11.15; N, 4.41

Found: C, 67.52; H, 6.18; Cl, 10.90; N, 4.29

In emetic activity studies in dogs, 1-N-ethylnorapomorphine was found to have a minimum effective dose (MED) on intravenous (i.v.) administration of 0.00025 mg./kg. In the same tests with 1-apomorphine, the latter was found to have an MED of 0.012 mg./kg. (i.v.).

In hypotensive activity studies in the anesthetized cat, 1-N-ethylnorapomorphine was found to have an MED on intravenous administration of 0.0002 mg./kg. In the same tests with 1-apomorphine, the latter was found to have an MED of 0.001 mg./kg. (i.v.).

The $LD_{50}$, the dose lethal to 50 percent of the test animals, on intravenous administration in mice of 1-N-ethylnorapomorphine and 1-apomorphine were found to be 45 mg./kg. and 71 mg./kg., respectively.

EXAMPLE 5

1-N-n-Propylnormorphine (II: R is n—$C_3H_7$)

A mixture of 2.7 g. (0.01 mole) of 1-normorphine, 2 g. (0.024 mole) of sodium bicarbonate, and 1 ml. (0.01 mole) of n-propyl iodide in 25 ml. of dimethylformamide was heated on a steam bath for several hours, evaporated essentially to dryness under reduced pressure, the residue triturated with water, and the resulting solid was collected and dried giving 2.4 g. of 1-N-n-propylnormorphine.

1-N-n-Propylnormorphine was also prepared by reductive alkylation according to the following procedure:

25 g. (0.093 mole) of 1-normorphine was dissolved in a mixture of 75 ml. of glacial acetic acid, 400 ml. of acetone, 160 ml. of water, and 12 g. of anhydrous sodium acetate. To the resulting mixture was then added 25 ml. (0.35 mole) of propionaldehyde, and the solution was cooled to −20° C. The mixture was then treated over a period of about 20 minutes while stirring at about − 3° C. with 9 g. (0.24 mole) of sodium borohydride. Second portions of 25 ml. of propionaldehyde and 9 g. of sodium borohydride were then added, and the reaction mixture stirred and allowed to warm to room temperature. The mixture was diluted with 250 ml. of water, rendered strongly acidic with concentrated hydrochloric acid, extracted with four 100 ml. portions of ether, and the aqueous raffinate treated carefully with an excess of ammonium hydroxide. The solid which separated was collected and dried giving 18 g. of 1-N-n-propylnormorphine, m.p. 228°–230° C. (uncorr.), which after several recrystallizations from ethanol gave m.p. 233°–235° C. (uncorr.); $[a]_D$ − 135° C. (0.53 percent ethanol).

EXAMPLE 6

1-N-n-Propylnorapomorphine Hydrochloride (I: R is n—$C_3H_8$.)

A solution of 15 g. (0.048 mole) of 1-N-n-propylnormorphine in 85 ml. of 85 percent phosphoric acid was heated in an oil bath at an internal temperature of 145°–150° C. for 1 hour while passing a stream of anhydrous hydrogen chloride through the solution. The mixture was then cooled, diluted with 30 ml. of water, and the solution saturated with solid sodium chloride to cause the separation of an amorphous solid. The latter was collected and dissolved in a minimum amount of water, and the solution treated with 1.5 g. of sodium sulfite. The mixture was then extracted with ether, and anhydrous hydrogen chloride gas was bubbled through the combined extracts. The oily solid which separated was collected, triturated with ether, and the resulting solid was recrystallized from isopropanol/ether to give 0.7 g. of 1-N-n-propylnorapomorphine as a slightly greenish solid, m.p. 150°–200° C. (corr.).

Anal. Calcd. for $C_{19}H_{21}NO_2$·HCl: C, 68.76; H, 6.68; Cl, 10.68

Found: C, 68.39; H, 6.81; Cl, 10.58.

In emetic activity studies in dogs, 1-N-n-propylnorapomorphine was found to have a minimum effective dose (MED) on intravenous administration of 0.0005 mg./kg.

In hypotensive activity studies in the anesthetized cat, 1-N-n-propylnorapomorphine was found to have an MED on intravenous administration of 0.000075 mg./kg.

The $LD_{50}$, the dose lethal to 50 percent of the test animals, on intravenous administration in mice of 1-N-n-propylnorapomorphine was found to be 79.0 mg./kg.

EXAMPLE 7 d,1-N-n-Propylnorapomorphine Hydriodide (I: R is n—$C_3H_7$)

1-(2-Nitro-3,4-dimethoxybenzyl)-2-propyl-1,2,3,4-tetrahydroisoquinoline (1.5 g., 0.004 mole) was dissolved in 50 ml. of methanol and reduced with hydrogen over 250 ml. of 5 percent palladium-on-charcoal. When reduction was complete, the solution was filtered from the catalyst and evaporated to dryness giving an oily residue which was distilled in vacuo to give 0.95 g. of 1-(2-amino-3,4-dimethoxybenzyl)-2-propyl-1,2,3,4-tetrahydroisoquinoline as a viscous pale yellow oil, b.p. 182° C./0.1 mm., $n_D^{25}$ = 1.5761.

The latter (5.10 g., 0.015 mole), dissolved in 1N sulphuric acid, was treated dropwise at 2° C. with an aqueous solution of sodium nitrite until a positive test for nitrous acid was obtained on starch-iodide paper. The solution was then stirred for an additional fifteen minutes at room temperature, treated with 1.0 g. of copper powder, stirred under nitrogen, and filtered. The filtrate was then treated with 1.0 g. of zinc dust and 10 ml. of 1N sulphuric acid, heated on a steam bath for 15 minutes, and filtered. The filtrate was basified with ammonium hydroxide, extracted with ether, and the combined ether extracts dried, and taken to dryness. The residual oil, consisting of 1.85 g. of d,1-N-n-propylnorapomorphine dimethyl ether, was converted to its hydriodide salt, m.p. 245° C.

The latter was dissolved in about 4 ml. of 57 percent hydriodic acid, treated with about 3 ml. of acetic anhydride, and the resulting mixture heated under reflux for 1 hour. The reaction mixture was cooled to room temperature, diluted with ether and the solid which separated was collected and recrystallized from ethanol/ether to give d,1-N-n-propyl-norapomorphine hydriodide, m.p. 278° C. (dec.).

In emetic activity studies in dogs, d,1-N-n-propylnorapomorphine was found to have a minimum effective dose (MED) on intravenous administration of 0.00125 mg./kg. In the same tests with d,1-apomorphine, the latter was found to have an MED of 0.025 mg./kg. (i.v.).

The $LD_{50}$, the dose lethal to 50 percent of the test animals, on intravenous administration in mice for both d,1-N-n-propylnorapomorphine and apomorphine was found to be > 10.0 mg./kg.

EXAMPLE 8

1-N-n-Butylnormorphine (II: R is n—$C_4H_9$).

To a solution of 12 g. (0.044 mole) of normorphine, 38 ml. of glacial acetic acid, 68 ml. of ethanol, 68 ml. of water, and 7.5 g. (0.063 mole) of anhydrous sodium acetate was added 12 ml. (0.20 mole) of n-butyraldehyde. The resulting solution was cooled to 0° C., and 8 g. (0.22 mole) of sodium borohydride was added portion-wise over a period of about an hour and a half while maintaining the reaction temperature at 4° to 8° C. An additional 12 ml. of n-butyraldehyde was added after about half of the borohydride had been added. The mixture was stirred for an additional 30 minutes following addition of the borohydride, and the reaction mixture was then treated with 8 ml. of concentrated hydrochloric acid in 400 ml. of water. The reaction mixture was extracted with ether to remove excess aldehyde, adjusted to pH 9 by addition of aqueous ammonium hydroxide, and the resulting mixture extracted with methylene dichloride. Drying of the methylene dichloride extracts over sodium sulfate and evaporation to dryness gave a semi-solid which, after trituration with ether, afforded 6.4 g. of 1-N-n-butylnormorphine as a buff-colored solid, m.p. 195°–198° C. (dec.), $[a]_D^{28}$ −115° (1 percent, ethanol).

EXAMPLE 9

1-N-n-Butylnorapomorphine Hydrochloride (I: R is n—$C_4H_9$)

A suspension of 5 g. (0.015 mole) of 1-N-n-butylnormorphine in 28 ml. of 85 percent phosphoric acid was heated in an oil bath at 145°–150° C. while a stream of anhydrous hydrogen chloride was passed through the mixture. The passage of hydrogen chloride was continued for one hour after all suspended solid had dissolved, and the cooled reaction mixture was poured into 95 ml. of water. The product was salted out by addition of 10 g. of solid sodium chloride. After isolation of the crude product, it was converted to the free base form, extracted with ether, and converted to the hydrochloride salt. There was thus obtained 1.2 g. of 1-N-n-butylnorapomorphine hydrochloride as a light tan powder, m.p. 175°–190° C.

Anal. Calcd. for $C_{20}H_{23}NO_2 \cdot HCl$: C, 69.43; H, 6.94; Cl, 10.28; N, 4.05
Found: C, 69.27; H, 7.04; Cl, 10.34; N, 4.09.

EXAMPLE 10

1-N-(2-Chlorobutyl)norapomorphine Hydrochloride (I: R is $CH_3CH_2CHClCH_2$)

A suspension of 6 g. (0.018 mole) of 1-N-n-cyclopropyl-normorphine in 75 ml. of 85 percent phosphoric acid was heated at 150° C. for 30 minutes while bubbling a stream of anhydrous hydrogen chloride through the mixture. The resulting solution was heated for an additional hour at 150° C., cooled, and poured into 150 ml. of saturated aqueous sodium chloride. The resin which separated was collected, washed with water, dissolved in 500 ml. of water at 60° C., filtered, and the filtrate treated with a solution of 30 g. of sodium sulfite in 200 ml. of water. The resulting mixture was cooled to 0° C., extracted with three 250 ml. portions of chloroform, and the combined chloroform extracts diluted with an equal volume of ether, and dried over sodium sulfate. The dried organic solution was treated with 100 ml. of saturated ethereal hydrogen chloride and evaporated to dryness in vacuo giving 1.1 g. of an amorphous powder, m.p. 160°–180° C. (dec.). The latter was recrystallized once from an absolute ethanol/ether mixture and once from acetonitrile giving 121 mg. of 1-N-(2-chlorobutyl)norapomorphine hydrochloride, m.p. 170°–175° C.

Anal. Calcd. for $C_{20}H_{22}ClNO_2 \cdot HCl$: C, 63.16; H, 6.09; Cl, 18.64; N, 3.68
Found: C, 62.55; H, 6.28; Cl, 17.55; N, 3.69.

EXAMPLE 11

1-N-Isopropylnormorphine [II: R is $(CH_3)_2CH$] is prepared by reacting 1-normorphine with isopropyl bromide in the presence of sodium bicarbonate in dimethylformamide following the manipulative procedure described above in Example 5.

EXAMPLE 12

1-N-Isopropylnorapomorphine [I: R is $(CH_3)_2CH$] is prepared by rearrangement of 1-N-isopropylnormorphine in 85 percent phosphoric acid in the presence of anhydrous hydrogen chloride using the manipulative procedure described above in EXAMPLES 4 and 6.

EXAMPLE 13

1-N-Cyclopropylcarbonylnorapomorphine (I: R is $C_3H_5CO$)

Reaction of norapomorphine with cyclopropylcarbonyl chloride in a benzene solution, in the presence of a slight molar excess of triethylamine, affords 1-N-cyclopropylcarbonylnorapomorphine.

EXAMPLE 14

1-N-Cyclopropylmethylnorapomorphine (I: R is $C_3H_5CH_2$)

Reduction of 1-N-cyclopropylcarbonylnorapomorphine with lithium aluminum hydride in tetrahydrofuran, and isolation of the product from a basic medium after decomposition of excess hydride with water, affords 1-N-cyclopropylmethylnorapomorphine.

EXAMPLE 15

1-N-(2-Phenylethyl)normorphine (II: R is $C_6H_5CH_2CH_2$)

Normorphine (12 g., 0.045 mole) was dissolved in a mixture of 200 ml. of acetone, 34 ml. of glacial acetic acid, 80 ml. of water, and 6 g. of anhydrous sodium acetate. To the mixture was added 5 ml. of phenylacetaldehyde, and the mixture was stirred at 0°–5° C. while adding 4 g. (0.108 mole) of sodium borohydride over a thirty minute period. Second portions of 5 ml. of phenylacetaldehyde and 4 g. of sodium borohydride were similarly added, and the reaction mixture was then allowed to warm slowly to room temperature. The mixture was then diluted with 200 ml. of water, acidified carefully with excess concentrated hydrochloric acid, and extracted with three 200 ml. portions of ether. The aqueous raffinate was then basified by the addition of excess concentrated ammonium hydroxide, and the solid material which separated was collected, washed with water and dried to give 10 g. of crude product, m.p. 247°–250° C. Recrystallization of this material from an ethanol/chloroform mixture afforded 1-N-(2-phenylethyl)normorphine as a colorless solid, m.p. 248°–250° C.

Anal. Calcd. for $C_{24}H_{25}NO_3$: C,76.00; H,6.93; N,3.85
Found: C,75.97; H, 6.84; N,3.69.

EXAMPLE 16

1-N-(2-Phenylethyl)norapomorphine hydrochloride (I: R is $C_6H_5CH_2CH_2$).

A suspension of 8 g. (0.022 mole) of 1-N-(2-phenylethyl)normorphine is 80 ml. of 85 percent phosphoric acid was heated to 150° C. over a 30 minute period while anhydrous hydrogen chloride was passed through the mixture and was then maintained at 150° C. for one hour while hydrogen chloride was continuously bubbled through the mixture. The solution was then cooled and poured slowly with stirring into 175 ml. of saturated aqueous sodium chloride, and the precipitate that separated was collected, suspended in 50 ml. of water, refiltered, and dissolved in a mixture of 400 ml. of water and 200 ml. of ethanol containing 20 g. of sodium sulfite at 60° C. Extraction of the solution with two 250 ml. portions of chloroform, dilution of the combined extracts with one liter of ether, drying the extracts over magnesium sulfate, and evaporation of the solvent afforded a dark brown solid. The latter was dissolved in 600 ml. of water at 60° C., the solution filtered through glass wool, and the filtrate treated with 20 g. of sodium sulfite. The cream-colored solid which separated was collected, dissolved in ether and the resulting solution treated with 50 ml. of ethereal hydrogen chloride which caused the separation of 1.5 g. of 1-N-(2-phenylethyl)norapomorphine hydrochloride as a light tan solid, m.p. 170°–180° C.

Anal. Calcd. for $C_{24}H_{23}NO_2 \cdot HCl$: C,73.16; H,6.14; Cl,9.00; N,3.56

Found: C,72.44; H,6.27; Cl,9.18; N,3.82.

I claim:
1. A compound having the formula

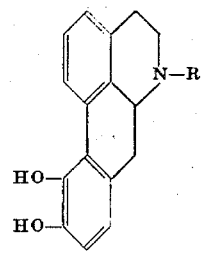

wherein R is lower-alkyl containing from two to four carbon atoms; 2-chlorobutyl; cyclopropyl; cyclopropylmethyl; or 2-phenylethyl.

2. 1-N-Ethylnorapomorphine according to claim 1 wherein R is $C_2H_5$.

3. 1-N-n-Propylnorapomorphine according to claim 1 wherein R is n—$C_3H_7$.

4. d,1-N-n-Propylnorapomorphine according to claim 1 wherein R is n—$C_3H_7$.

5. 1-N-n-Butylnorapomorphine according to claim 1 wherein R is n—$C_4H_9$.

6. 1-N-(2-Chlorobutyl)norapomorphine according to claim 1 wherein R is $CH_3Ch_2CHClCH_2$.

7. 1-N-(2-Phenylethyl)norapomorphine according to claim 1 wherein R is $C_6H_5CH_2CH2$.

* * * * *